Figure 1:
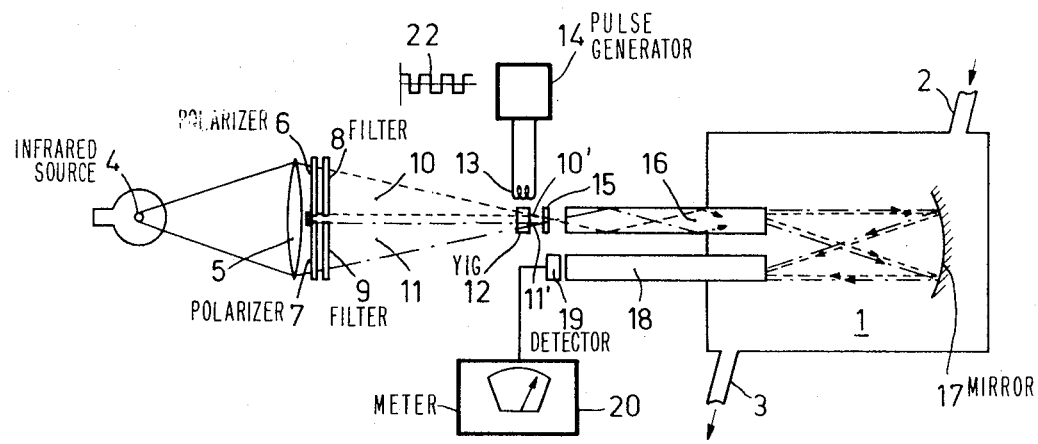

United States Patent [19]
Jackson et al.

[11] 3,784,307
[45] Jan. 8, 1974

[54] METHODS AND APPARATUS FOR DETERMINING THE RELATIVE AMOUNT OF SUBSTANCE PRESENT IN A TRANSPARENT MEDIUM

[75] Inventors: John Jackson, Haywards Heath; Robert Fagan Donat Bradshaw, Markyate, both of England

[73] Assignee: U.S. Philips Corporation, New York, N.Y.

[22] Filed: Nov. 16, 1970

[21] Appl. No.: 89,700

[30] Foreign Application Priority Data
Nov. 18, 1969  Great Britain................... 56,362/69

[52] U.S. Cl. .............. 356/51, 250/83.3 H, 250/218, 350/150, 356/205
[51] Int. Cl. ........................................... G01n 21/22
[58] Field of Search ....................... 250/83.3 H, 218; 356/51, 72, 102–104, 207–208, 114, 115, 116, 117, 118, 119; 350/148, 150, 151

[56] References Cited
UNITED STATES PATENTS

| | | | |
|---|---|---|---|
| 3,383,460 | 5/1968 | Pritchard | 350/150 UX |
| 2,928,310 | 3/1960 | Christie | 356/114 |
| 2,978,951 | 4/1961 | Christie | 356/114 X |
| 3,364,351 | 1/1968 | Palmer et al. | 250/83.3 H X |
| 3,588,496 | 6/1971 | Snowman | 356/51 X |
| 3,499,159 | 3/1970 | Carrier et al. | 356/119 X |

OTHER PUBLICATIONS
Wood, "Improved Infrared Absorption Spectra Hygrometer," Rev. Sci. Inst. V. 29, No. 1, Jan., 1958, pp. 36–40

Krinchik et al., "Magneto-Optical Properties of Garnet Ferrites in the Infrared Region," Soviet Physics Jetp, V. 13, No. 3, Sept. 1961, pp. 509–511 (331/94.5 MAG–MOD).

Anderson, "Microwave Modulation of Light Using Ferrimagnetic Resonance" J. App. Phys., V. 34, No. 4, part 2, Apr. 1963, pp. 1230–1231 (331/94.5 MAG–MOD).

Zitter et al., "Infrared & Visible Laser Modulation Using Faraday Rotation in YIG" J. App. Phys., V. 37., No. 3, Mar., 1966, pp. 1089–1090 (331/94.5 MAG–-MOD).

*Primary Examiner*—Ronald L. Wibert
*Assistant Examiner*—F. L. Evans
*Attorney*—Frank R. Trifari

[57] ABSTRACT

A method and apparatus for monitoring the presence of water vapor in helium features providing two narrow infrared frequency band within and outside a water vapor absorption band, alternately projecting the two bands of infrared radiation into the helium by using the polarization properties of the infrared radiation, and subsequently detecting the two infrared bands and comparing their amplitudes. Besides providing an accurate and reliable measurement, the invention is compact and requires no moving mechanical parts.

10 Claims, 2 Drawing Figures

INVENTORS
JOHN JACKSON
ROBERT F. D. BRADSHAW
BY
AGENT

METHODS AND APPARATUS FOR DETERMINING THE RELATIVE AMOUNT OF SUBSTANCE PRESENT IN A TRANSPARENT MEDIUM

The present invention relates to methods and apparatus for determining the relative amount of a substance present in a transparent medium and especially but not exclusively to the determination of the relative amount of water vapour present in helium gas.

It is frequently necessary to determine the amount of a substance such as water vapour in a transparent fluid medium such as a gas. For example, helium gas has been proposed as the thermal transport fluid in a gas cooled nuclear reactor or pile, and it is important in such a system to monitor the presence of water vapour in the helium circuit since this can signify a fault condition which it is important to rectify.

It is an object of the present invention to provide an improved method and apparatus for measuring the presence of a substance, for example water vapour, in a transparent medium, for example helium gas.

In accordance with the present invention there is provided a method of determining the relative amount of a substance present in a transparent medium in which a beam of radiation is passed through said transparent medium and including the steps of forming first and second substantially mutually perpendicularly plane polarised beam components, said first beam component comprising a narrow band of frequencies lying within a radiation absorption band of said substance, said second beam component comprising a further band of frequencies which are substantially unabsorbed by said substance or by said medium, rotating the plane of polarisation of both said components so that said planes of polarisation alternate between two substantially perpendicular orientations, selectively passing radiation having a predetermined plane of polarisation in such a way that said respective beam components are passed alternately, and comparing the respective intensities of said beam components, the radiation present respectively in said beam components being so arranged that it follows a substantially common path through said medium.

The first and second beam components can be arranged to pass through the medium via a substantially common path, alternatively the radiation can be passed through the transparent medium prior to the formation of the first and second beam components. Rotation of the plane of polarisation can be effected by means of a Faraday rotation device in response to an applied magnetic field, and conveniently YIG or a YIG-derived substance can be employed in the Faraday rotation device, the radiation in this case being in the infra-red region of the spectrum. The incident beam of radiation can comprise a component of uniform intensity and a periodic component of predetermined frequency, said components having a constant relative amplitude relationship, to provide a signal of reference amplitude when comparing the respective intensities of said first and second beam components. The method can be employed for determining the relative amount of water vapour present in helium gas, and the bands of frequencies occupied by said first and second beam components can be chosen to lie within a carbon dioxide absorption window.

According to the invention there is further provided apparatus for determining the relative amount of a substance present in a transparent medium comprising a source of radiation, means for passing radiation from said source through said transparent medium, filtering and polarising means for forming a first and a second radiation component, said first radiation component comprising radiation plane polarised in a predetermined direction and occupying a first relatively narrow band of frequencies lying within a radiation absorption band of said substance and said second radiation component comprising radiation plane polarised in the direction substantially perpendicular to said predetermined direction and occupying a second relatively narrow band of frequencies which are substantially unabsorbed by said substance or by said medium, a device through which first and second radiation components are passed for rotating the plane of polarisation of both said components to the same extent dependant on a field applied to said device, means for varying said field applied to said device so that the planes of polarisation of the respective emergent beam components alternate between two substantially perpendicular orientations, polarisation selection means arranged so that said radiation components are passed alternately in response to the variations in said field, and radiation detection and comparison means for comparing the magnitudes of said alternately passed beam components, the arrangement being such that the radiation present respectively in said two beam components follows a substantially common path through said medium. Said device can comprise a Faraday effect element actuated by a magnetic field, and the Faraday effect element can be a YIG or a YIG-derived substance, the radiation being in the infra-red region. The transparent medium can be present in a container having radiation inlet and outlet windows, comprising radiation guides located in the path of the first and second radiation components and so arranged that said first and second radiation components follow a substantially common path when entering and leaving said container via the inward facing boundaries of said windows. Means can be provided for modulating said radiation source so that radiation from said source comprises a component of uniform intensity and a periodic component of predetermined frequency said components having a constant relative amplitude relationship, and said radiation detection means can include means for sensing the amplitude of said periodic component and for adjusting the sensitivity of said detection and comparison means so that the output of said comparison means is substantially only dependent on the relative amount of said substance present in said medium.

Figure 2:
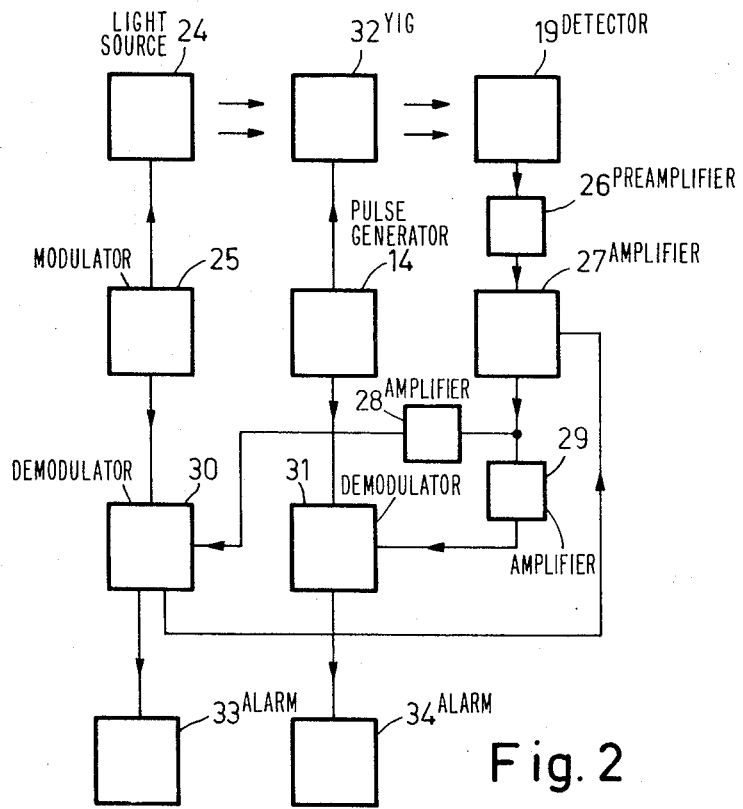

In order that the present invention may be clearly understood and readily carried into effect an embodiment thereof will now be described, by way of example, with reference to the accompanying drawings, of which:

FIG. 1 is a schematic diagram illustrating a water vapour monitor employing the invention; and FIG. 2 is a block schematic diagram representing the electrical circuitry employed in the apparatus shown in FIG. 1.

Reference will now be made to FIG. 1 which illustrates apparatus for determining the relative amount of water vapour in helium gas. A sample of helium gas is passed into a sample cell 1 via an inlet 2 from a helium supply, not shown, and can be returned to the supply via an outlet 3. A source 4 of infra-red radiation comprises a tungsten lamp which is under-run so as to provide a long working life and a stable output of radiation. A lens 5 forms the radiation emitted by the source 4 into a converging beam. Two polarisers 6, 7 are arranged side by side in the path of the radiation beam from the lens 5. Radiation emerging from the polariser 6 is plane polarised in the plane of the drawing and is incident on a filter 8. The filter 8 passes a narrow band of frequencies centred about a wave length of 1.87 micron which is the centre of the water vapour absorption line. The filter 8 can conveniently take the form of an interference filter. Thus a first beam component 10 emerges from the filter 8, which is plane polarised in the plane of the drawing and comprises a narrow band of frequencies lying within the 1.87 micron water vapour absorption band.

Radiation emerging from the polariser 7 is plane polarised in a direction perpendicular to the plane of the drawing and is incident on the filter 9. The filter 9 which can also conveniently be an interference filter, passes a narrow band of frequencies centered about a wave length of 1.7 microns which forms a second beam component 11, plane polarised in a direction at right angles to that of the first beam component 10. Both the pass bands of the filters 8 and 9 lie within a window region in which carbon dioxide does not substantially absorb radiation, so that any carbon dioxide present in the helium gas will not significantly affect the relative intensities of the two beam components.

The two beam components 10, 11 are directed on to a garnet Faraday effect element 12, conveniently a yttrium iron garnet (YIG) or derivatives thereof. The element 12 is located in a magnetic field determined by a current from a source 14 of square waves, typified in form by the inset current/time graph 22 which current energises a control coil symbolised at 13. The beam components 10' and 11' on emerging from the element 12 will each have its polarisation plane alternating between orientations corresponding to the two values of current, I, assumed in different intervals of time $t$, the square wave has such a magnitude that these two polarisation plane orientations are mutually perpendicular for a respective beam component. Conveniently, the currents are such that the plane of polarisation is rotated alternately by ± 45° about the emergent orientation direction when the field is zero.

The beam components 10' and 11' proceed to an analysing polariser 15 so orientated with reference to the two perpendicular polarisation planes of the respective beam components that the beam components are passed alternately in correspondence with the respective duration of the two values of the current, I.

The beam components thus emerge alternately from the polariser 15 and pass through a sample cell window 16 into sample cell 1 to fall on a concave mirror 17. The sample cell window 16 is in the form of a radiation guide in which radiation passing there-along is caused to suffer repeated total internal reflection at the sides of the guide, and the length of the guide is such that on emerging, the two beam components are so scrambled that they follow a substantially common path both through the inwardly facing boundary of the window 16 and through the sample of helium gas contained in the sample cell 1. The beam components are reflected by the mirror 17 and focused onto the inward facing surface of a further cell window 18 which can be of the same form as that of the window 16, and on emerging therefrom pass to the sensitive region of an infra-red radiation detector 19, conveniently one employing lead sulphide as a photo-conductor. The relative intensities of the two beam components are adjusted, for example by a variable aperture placed in the path of one of said beam components, so that when no water vapour is present in the helium sample in the cell 1, the output of the detector 19 is the same for both components. The output from the detector 19 is demodulated in synchronism with the waveform 22 and an output is displayed which is representative of the reduction in the intensity of the first said beam component due to absorption by water vapour present in the cell 1, when compared with the intensity of said second beam component. The amount of this absorption is a measure of the relative concentration of water vapour present in the sample of helium gas in the cell 1 and can be displayed with meter 20.

FIG. 2 illustrates in schematic form the circuit arrangement employed in the operation of the apparatus shown in FIG. 1. The output of a light source 24 comprising the tungsten lamp 4, is controlled by a modulator 25 so that the intensity of the emitted radiation comprises a steady d.c. component together with an alternating component having a frequency of 30 Hz. The ratio between the peak intensities of the d.c. and a.c. components of the emitted radiation is maintained substantially constant.

The block 32 in the path of radiation from the source 24, comprises the YIG Faraday effect element 12 together with the associated coil 13 which is fed from the squarewave modulator source 14 whose repetion frequency is significantly higher than that of the alternating component superimposed on the output of the source 24.

The output of the radiation detector 19 amplified by pre-amplifier 26, a variable-gain amplifier 27 and is then supplied to the input of the stable gain tuned amplifier 29 resonant at the frequency of the squarewave applied to the Faraday effect device 32.

The output from the amplifier 29 is supplied to a synchronous demodulator 31 which is fed with a reference output from the pulse modulation source 14. The output of the synchronous demodulator 31 is a signal whose amplitude is dependent on the difference in the intensities of the first and second radiation beam components incident on the detector 19. The intensity of the second beam component is substantially unaffected by the presence of water vapour and therefore forms a reference beam. The intensity of the first beam component which is initially adjusted to be equal to that of the second beam component in the absence of water vapour, will be reduced by an amount dependent on the concentration of water vapour in the sample. Thus the alternation between the two beam components in the presence of water vapour in the sample will give rise to an ouput signal which is derived from the synchronous demodulator 31, the amplitude of which is therefore dependent on the amount of water vapour present in the sample.

However, the amplitude of the output from the synchronous demodulator 31 will also be affected by variations in system parameters such as the sensitivity of the radiation detector 19, the gains of the amplifiers 26, 27 and those parameters which determine the intensities of the beam components incident on the radiation detector 19 such as the intensity of the source 24, the transmission factors of the cell windows 16 and 18, the reflective coefficient of the mirror 17, and the alignment and efficiency of the radiation guides. The effect of such system variations is made substantially identical for both beam components by causing the beam components to follow a substantially common path through the cell, and through the inward facing boundaries of the windows 16 and 18 on which for example dust is especially liable to be deposited.

The effect on the amplitude of the output signal of the demodulator 31 of such variations in system parameters, is substantially removed by an automatic gain control arrangement by means of which the amplitude of the signal derived from the 30 Hz alternating component of the source intensity and hence also the signal representing the intensity of the second beam component, is maintained substantially constant at the output of the gain control amplifier 27.

The output from the amplifier 27 is fed via a stable gain tuned amplifier 28 resonant at the frequency of the 30 Hz alternating component of the source 24, to a synchronous demodulator 30 which is also fed with a 30 Hz reference output from the modulator 25. The output from the demodulator 30 is then employed to control the gain of the variable-gain amplifier 27 so that the amplitude of the 30 Hz signal is maintained substantially constant at the output thereof. If the output of the demodulator 30 falls below a minimum value, indicating an excessive absorption of radiation due, for example, to dust on the inward facing surfaces of the cell windows, or the output disappeared indicating a failure of the source 24, this condition is detected in a lamp-failure alarm circuit 33 and an appropriate alarm signal is given.

The operation of the gain control circuit enables the output from the synchronous demodulator 31 to be employed by output and alarm circuits 34 to display the relative concentration of water vapour in the sample directly on a suitable indicator, and can be monitored so that an alarm signal is given when the amplitude, and hence the relative concentration of water vapour, exceeds a predetermined threshold value.

In alternative embodiments of the invention the sample cell 1 can be located between the source 4 and the lens 5, provided that radiation from the source 4 passing through the cell and the inward facing cell windows, is effectively scrambled with respect to the formation of the two beam components 10 and 11 so that any localised attenuation of radiation on passage through the sample cell will produce substantially equal reductions in the intensity of each beam component 10 and 11. The Faraday rotation device 12 can also be replaced by a device employing one or more plates of a substance capable of producing rotation of the plane of polarisation dependent on an applied electric field.

The radiation need not be reflected by a mirror 17 in the sample cell 1 but can be directed across from the window 16 on one side of the cell to the outlet window 18 situated at the other side. A lens can be located in the radiation path to concentrate radiation from the window 16 onto the window 18. Alternatively if the intensity of the source 4 and the sensitivity of the detector 19 are sufficient, the lens can be dispensed with.

Whereas the invention has been described with reference to measuring the relative amount of water vapour in helium gas, the same can also be employed for measuring the relative amount of other substances present in radiation transparent media, and such media can be gaseous, liquid or solid, providing always that suitable absorption and reference bands or frequencies can be employed for the two components as herein described.

What we claim is:

1. A method of determining the relative amount of substance present in a transparent medium comprising the steps of generating a first beam of radiation, separately polarizing portions of said first beam of radiation into a second and third beam of radiation, said second and third beams of radiation being along mutually polarized perpendicular planes, filtering said second beam of radiation and passing a first beam component exhibiting a narrow band of frequencies within an absorption band of said substance and filtering said third beam of radiation and passing a second beam component exhibiting a band of frequencies which are substantially unabsorbed by said substance, periodically rotating the plane of polarization of said first and second beam components through an angle of rotation of 90° selectively passing said first and said second beam components alternately, projecting said first and said second beam components into said medium along a substantially common path through said medium, and detecting the difference of intensities of said first and said second beam components whereby said first and second beam components have a similar genesis but because of said filtering said first beam component is absorbed by said substance and said second beam component is not affected by said substance and said first and second beam components being polarized along mutually perpendicular planes are differentiated and the difference in the intensity of said first and second beam components is detected to indicate the amount of said substance present in said transparent medium as a function of the difference in the intensity of said first and second beam components.

2. A method according to claim 1, wherein the periodic rotation of the plane of polarization of the beams is accomplished optoelectronically.

3. A method according to claim 2 wherein said step of generating a first beam of radiation includes generating a first beam of infrared radiation.

4. A method according to claim 1, further comprising modulating the intensity of said beam of radiation generated to provide a component of uniform intensity and a component alternating at a predetermined frequency, said components having a constant relative amplitude relationship, and monitoring the amplitude of said alternating component in said second and said third beams after passing through said medium, and generating a feedback signal from the change in the amplitude in said monitored alternating component to control the amplitude of said component alternating at a predetermined frequency so that said amplitude is maintained substantially constant.

5. A method according to claim 1, wherein said step of passing a first beam component includes passing a first beam component within an absorption band of water vapor and said step of passing a second beam includes passing a second beam component exhibiting a band of frequencies which are substantially unabsorbed by said water vapor and projecting said first and second beam components into a helium gas medium along a substantially common path through said helium gas medium.

6. An apparatus for determining the relative amount of a substance present in a transparent medium comprising means for generating radiation, means for forming from said generated radiation first and second plane polarized beams having planes of polarization substantially mutually perpendicular, said means for forming being disposed within the path of said generated radiation from said means for generating radiation, means for filtering said first plane polarized beam to pass a first filtered beam having a narrow band of frequencies within an absorption band of said substance, means for filtering said second plane polarized beam to pass a second filtered beam having a band of frequencies which are substantially unabsorbed by said substance, means for periodically rotating the plane of polarization of said first and second filtered beams between two substantially perpendicular orientations, means for selectively passing said first and said second filtered beams alternately, means for projecting said first and said second filtered beams into said medium along a substantially common path through said medium, and means disposed in the path of said first and second filtered beams after said first and second filtered beams pass through said medium for receiving said first and second filtered beams, which means includes means for detecting the difference of intensities of said first and said second filtered beams.

7. An apparatus according to claim 6, wherein said means for periodically rotating the plane of polarization comprises a Faraday rotation device responsive to an applied magnetic field.

8. An apparatus according to claim 7 wherein said radiation is infrared radiation and said Faraday rotation device comprises A YIG substance.

9. An apparatus according to claim 6, further comprising means for modulating the intensity of the radiation generated to provide a component of uniform intensity and a component alternating at a predetermined frequency, said components having a constant relative amplitude relationship, and means for monitoring the amplitude of said alternating component in said first and said second beams after passing through said medium, and means for generating a feedback signal from the change in the amplitude in said monitored alternating component to control the amplitude of said component alternating at a predetermined frequency so that said amplitude is maintained substantially constant.

10. An apparatus according to claim 6, wherein said means for filtering said first plane polarized beam includes means for filtering said first plane polarized beam to pass a first filtered beam having a narrow band of frequencies within an absorption band of water vapor.

* * * * *